Oct. 11, 1927.
G. C. HALEY
1,645,482
HARROW TOOTH
Filed June 30, 1926
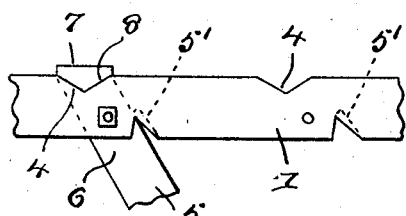
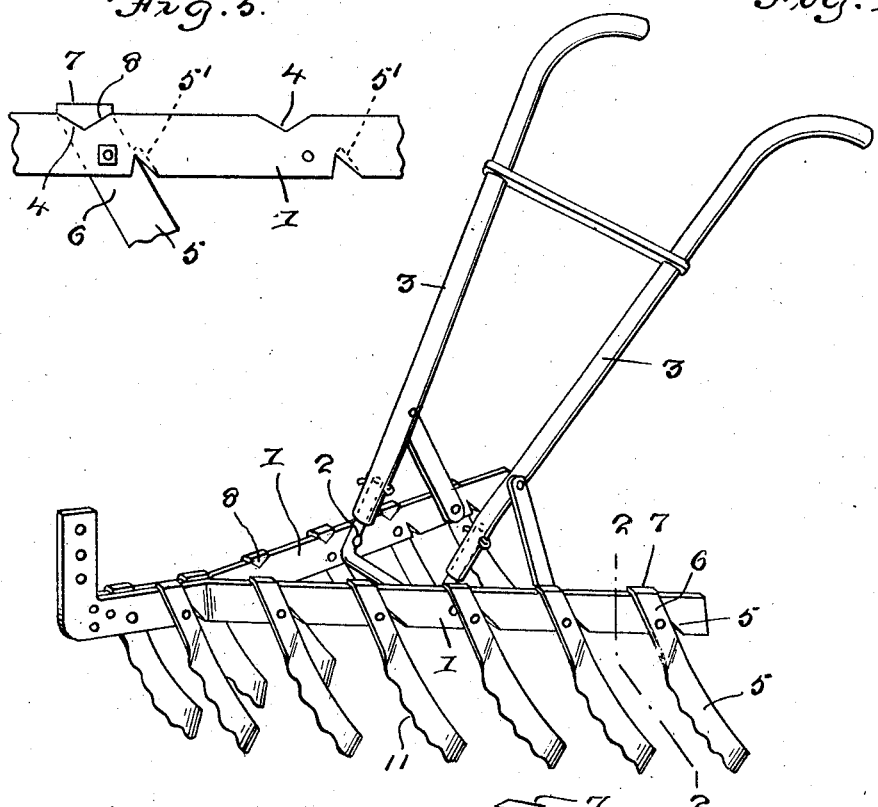
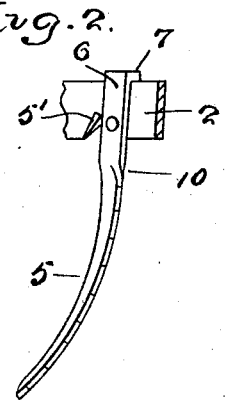
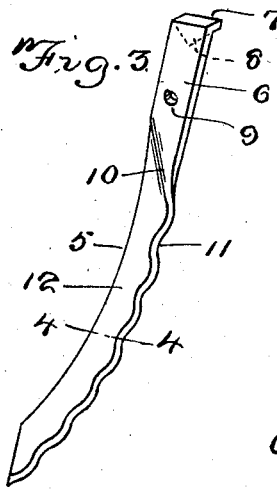
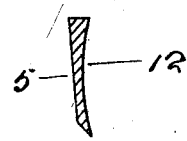
G. C. Haley INVENTOR
BY Victor J. Evans
ATTORNEY Patented Oct. 11, 1927.

1,645,482

UNITED STATES PATENT OFFICE.

GROVER C. HALEY, OF CYNTHIANA, KENTUCKY.

HARROW TOOTH.

Application filed June 30, 1926. Serial No. 119,731.

My present invention has reference to a harrow and my object is the provision of a harrow having teeth of a particular and peculiar construction whereby the same when entering the ground will be contacted thereby in a manner to exert a downward pressure upon the teeth so that the same will be effectively held at their work without the necessity of the operator exerting undue pressure upon the handle of the device.

A further object is the provision of a harrow tooth of a particular and novel construction, and a harrow mount therefor whereby the tooth will be effectively sustained thereon with the employment of only a single sustaining element.

To the attainment of the above broadly recited objects and others which will appear as the nature of the invention is better understood, the improvement also resides in certain other novel features of construction, combination and operative association of parts, a satisfactory embodiment of which is disclosed by the accompanying drawings.

In the drawings:

Figure 1 is a perspective view of a harrow in accordance with this invention.

Figure 2 is a sectional view approximately on the line 2—2 of Figure 1.

Figure 3 is a perspective view of the harrow tooth.

Figure 4 is a sectional view approximately on the line 4—4 of Figure 3.

Figure 5 is a detail elevation of one of the members of the harrow frame showing the manner in which the tooth is secured thereon.

The harrow frame is of the usual construction, the same having its rear portion V-shaped in plan. For distinction the angle sides of the frame, are indicated by the numerals 1. Between these sides there is fixed a substantially U-shaped yoke 2, and the arms of this yoke are received in the ends of the hollow handle members 3. The handle members are braced together and are suitably braced to the side members of the improvement, as disclosed by Figure 1 of the drawings. The side members 1, at equidistantly spaced points have their upper edges provided with V-shaped notches 4. Slightly to the rear of each V-shaped notch 4, the lower edges of the side members 1 are slitted angularly, and the metal bounded by these slits is bent outwardly to form lugs 5'.

The teeth 5 are of a particular and peculiar formation. Each tooth has an upper straight portion 6 whose end is bent angularly, as at 7, and the lower edge of the angle portion or flange 7 is V-shaped, as at 8, and these V-shaped lugs are designed to be received in the V-shaped notches 4 of the harrow. The straight portions are also provided with bolt openings 9, a bolt passing through the sides of the harrow and through the said openings 9, and each bolt has screwed thereon a nut. One edge of the tooth will contact with the lug 5'. By this arrangement it will be noted that the harrow teeth are easily arranged on the harrow and are effectively sustained thereon in a manner to withstand any strain to which they are subjected. From the straight portion the harrow tooth is slightly twisted upon itself, as at 10, and preferably the cutting edge of the tooth, beyond the twisted portion is widened. The cutting edge is corrugated, as at 11, and the inner face of the said tooth from its said edge 11 to its opposite straight edge, is concaved, as at 12. This concavity is best illustrated in Figure 4 of the drawings. This is an important feature of the invention inasmuch as the soil contacting with the dished or concaved face 12 of the cutting tooth will exert a pressure thereagainst, forcing the opposite straight face of said tooth against the soil, and by virtue of the pressure thus exerted against the concaved face the tooth will be held in the ground so that the operator is relieved of the labor of constantly exerting a downward pressure upon the handles 3.

The simplicity of the construction and the advantages thereof will be perfectly apparent to those skilled in the art to which such invention relates so that further detail description is not deemed necessary.

Having described the invention, I claim:—

A harrow blade comprising a member having an upper flat portion which is adapted to be secured to a harrow frame, said blade, from its said flat portion, being twisted upon itself and widened, on its cutting edge to its outer end, the cutting edge of the tooth being corrugated and the outer face of the said tooth, from its said twisted portion to its end being dished inwardly.

In testimony whereof I affix my signature.

GROVER C. HALEY.